United States Patent
Hapsari et al.

(10) Patent No.: US 8,463,236 B2
(45) Date of Patent: Jun. 11, 2013

(54) PAGING SIGNAL TRANSMISSION METHOD AND MOBILE STATION FOR THE SAME

(75) Inventors: Wuri Andarmawanti Hapsari, Yokosuka (JP); Minami Ishii, Yokohama (JP); Alf Zugenmaier, Munich (DE); Julien Laganier, Munich (DE)

(73) Assignee: NTT DoCoMo, Inc., Toyko (JP)

( * ) Notice: Subject to any disclaimer, the term of this patent is extended or adjusted under 35 U.S.C. 154(b) by 89 days.

(21) Appl. No.: 12/918,772

(22) PCT Filed: Feb. 20, 2009

(86) PCT No.: PCT/JP2009/053058
§ 371 (c)(1),
(2), (4) Date: Jan. 24, 2011

(87) PCT Pub. No.: WO2009/104749
PCT Pub. Date: Aug. 27, 2009

(65) Prior Publication Data
US 2011/0105078 A1    May 5, 2011

(30) Foreign Application Priority Data
Feb. 22, 2008    (JP) .................................. 2008-042098

(51) Int. Cl.
*H04M 1/66*    (2006.01)
*H04M 1/68*    (2006.01)
*H04M 3/16*    (2006.01)

(52) U.S. Cl.
USPC .................... 455/410; 455/404.1; 455/404.2; 455/414.1; 455/414.2; 455/414.3; 455/414.4; 455/418; 455/419; 455/420; 455/458; 455/515; 370/310.2; 370/312; 370/328

(58) Field of Classification Search
USPC .................. 455/410, 458, 515, 404.1, 404.2, 455/414.1, 414.2, 414.3, 414.4, 418–420; 370/310.2, 312, 328
See application file for complete search history.

(56) References Cited

U.S. PATENT DOCUMENTS

| | | |
|---|---|---|
| 2003/0172278 A1 | 9/2003 | Farnham et al. |
| 2007/0083766 A1 | 4/2007 | Farnham et al. |
| 2009/0296633 A1 | 12/2009 | Kitahara et al. |

FOREIGN PATENT DOCUMENTS

| | | |
|---|---|---|
| CN | 1507733 A | 6/2004 |
| EP | 2 040 393 A1 | 3/2009 |

(Continued)

OTHER PUBLICATIONS

3GPP TR 23.828 V0.1.0, Jan. 2008, 3rd Generation Partnership Project; Technical Specification Group Services and System Aspects; Earthquake and Tsunami Warning System Requirements and Solutions (ETWS); Solution Placeholder (Release 8), (16 pages).*

(Continued)

*Primary Examiner* — Steve D Agosta
(74) *Attorney, Agent, or Firm* — Osha • Liang LLP (57) ABSTRACT

A paging signal transmitting method includes a step of allowing each of mobile stations (UE) to receive security data from a network node (1) via a channel specified by a paging signal, a step of allowing each mobile station (UE) to calculate a third set of security information by using an open first set of security information and a second set of security information managed by each mobile station, a step of allowing each mobile station (UE) to compare the third set of security information with a fourth set of security information included in the received security data to verify the validity of the paging signal, and a step of allowing each mobile station (UE) to output a signal corresponding to the paging signal when the validity of the paging signal is verified.

5 Claims, 6 Drawing Sheets

FOREIGN PATENT DOCUMENTS

| | | | |
|---|---|---|---|
| EP | 2252097 A1 | | 11/2010 |
| EP | 2265046 A1 | | 12/2010 |
| JP | 11-234225 | * | 8/1999 |
| JP | 2004-320229 A | | 11/2004 |
| JP | 2005-515715 A | | 5/2005 |
| JP | 2007/148701 | * | 12/2007 |
| WO | 03/061241 A1 | | 7/2003 |
| WO | 2007/148701 A1 | | 12/2007 |

OTHER PUBLICATIONS

International Search Report issued in PCT/JP2009/053058, mailed on May 26, 2009, with translation, 4 pages.

Written Opinion issued in PCT/JP2009/053058, mailed on May 26, 2009, 4 pages.

Office Action for Chinese Patent Application No. 200980106145.7 issued Oct. 10, 2012, with English translation thereof (9 pages).

3GPP TR 23.828 v0.1.0, "3 Generation Partnership Project; Technical Specification Group Services and System Aspects; Earthquake and Tsunami Warning System Requirements and Solutions (ETWS); Solution Placeholder," (Release 8) (Jan. 2008).

Extended European search report for European Application No. 09712193.3 dated Dec. 6, 2012 (10 pages).

3GPP TSG-RAN-WG2 Meeting #60bis, R2-080396; "Way forward for ETWS," NTT DoCoMo, Sevilla, Spain, Jan. 14-18, 2008 (4 pages).

* cited by examiner

| |
|---|
| Protocol version(1 byte) |
| Disaster type(1byte) |
| Timestamp(4byte) |
| signing authority(3 byte) |
| signature(41 byte) |
| Location ID |

PAGING SIGNAL TRANSMISSION METHOD AND MOBILE STATION FOR THE SAME

TECHNICAL FIELD

The present invention relates to a paging signal transmission method by which a network node transmits a paging signal to multiple mobile stations and also relates to a mobile station for the same.

BACKGROUND ART

An "ETWS (Earthquake and Tsunami Warning System)" configured to distribute emergency information such as earthquake information or tsunami information has been studied in 3GPP as a subset of a "PWS (Public Warning System)."

Figure 7:
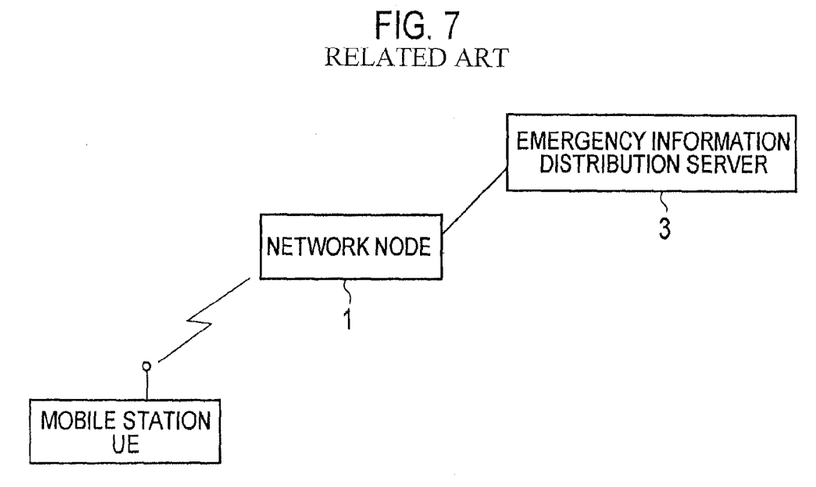
FIG. 7 is an overall configuration diagram of an ETWS.

As shown in FIG. 7, the ETWS includes a network node (including, for example, a radio base station eNB or the like) 1, an emergency information distribution server 3 and a mobile station UE.

Figure 8:
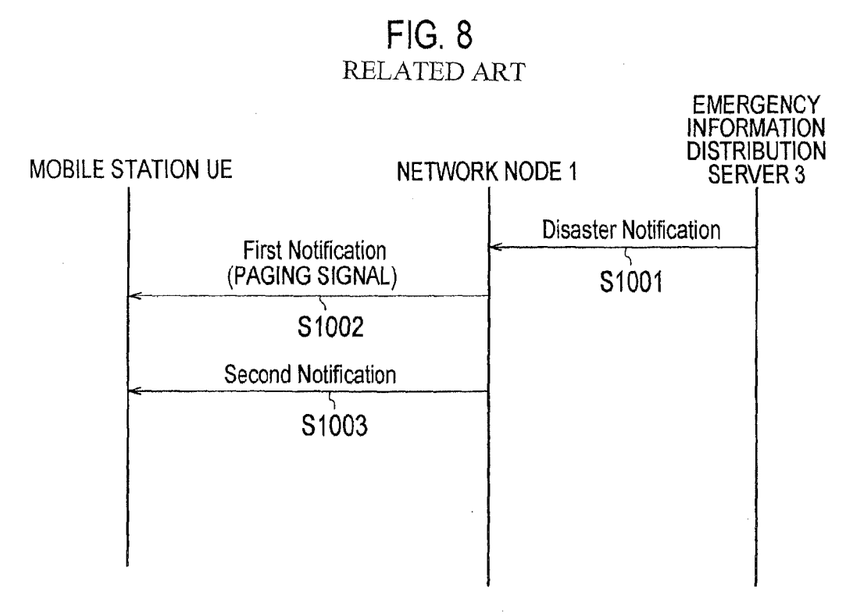
FIG. 8 is a sequence diagram for explaining an operation of transmitting emergency information in the ETWS.

In the ETWS as shown in FIG. 8, the emergency information distribution server 3 transmits a "Disaster Notification (emergency information)" indicating that a disaster has occurred, to the network node 1 in step S1001.

In step S1002, the network node 1 notifies multiple mobile stations UE that the disaster has occurred, by using a "First Notification (paging signal)."

When receiving the "First Notification," the mobile stations UE each perform output (such as buzzer output, alarm output or displaying on a display) for the "First Notification."

In step S1003, the network node 1 notifies the multiple mobile stations UE of detailed information on the disaster by using a "Second Notification."

Note that each mobile station UE receives the "Second Notification" based on information designated by the aforementioned "First Notification," and displays the detailed information on the display, the detailed information being notified by using the "Second Notification."

Since the aforementioned ETWS has a possible threat such as transmission of a "Fake First Notification (paging signal)" by an invalid radio base station, the aforementioned First Notification needs to be transmitted to the mobile station UE by secure communication.

In the configuration of ETWS shown in FIG. 7, it is assumable that the "Disaster Notification" is transmitted by secure communication using a dedicated line or IPsec, through an interface between the network node 1 and the emergency information distribution server 3, whereas there is a problem that the "First Notification (paging signal)" cannot be transmitted by security communication, through a radio interface between the network node 1 and the mobile station UE.

Specifically, a radio link for security communication is not established between the network node 1 and the mobile station UE at the time of transmitting the "First Notification (paging signal)." For this reason, the "First Notification (paging signal)" cannot be transmitted by security communication, through the radio interface between the radio base station eNB and the mobile station UE.

In addition, even if the link for security communication is established between the mobile station UE and the network node 1 such as the radio base station eNB, an exchange MME or gateway device S-GW, security cannot be provided using security information individually established for each mobile station UE by the network because the multiple mobile stations UE receiving the same paging signal each need to determine whether or not the received paging signal is directed thereto.

DISCLOSURE OF THE INVENTION

The present invention has been made in view of the above problem. An object of the present invention is to provide a paging signal transmission method capable of transmitting a paging signal to multiple mobile stations by secure communication and to provide a mobile station for the same.

A first aspect of the present invention is summarized as a paging signal transmission method by which a network node transmits a paging signal to a plurality of mobile stations, the method comprise receiving security data at each of the plurality of mobile stations from the network node through a channel designated by the paging signal, calculating third security information at each of the plurality of mobile stations by using first security information which is made public and second security information which is managed by the each mobile station, verifying the paging signal at each of the plurality of mobile stations by comparing the calculated third security information with fourth security information included in the received security data and outputting for the paging signal from each of the plurality of mobile stations when the verification of the paging signal succeeds at the each mobile station.

In the first aspect, wherein when the second security information is not managed, the each of the plurality of mobile stations calculates sixth security information by using the first security information and fifth security information which is included in the received paging signal and the each of the plurality of mobile stations performs the verification of the paging signal by comparing the calculated sixth security information with the fourth security information.

In the first aspect, wherein the security data is updated by the network node at predetermined timing.

In the first aspect, wherein the second security information is updated at predetermined timing or in response to a notification from the network node.

A second aspect of the present invention is summarized as a mobile station used in a mobile communication system in which a network node is configured to transmit a paging signal to a plurality of mobile stations, the mobile station comprise a security data receiver configured to receive security data from the network node through a channel designated by the paging signal, a verifier unit configured to verify the paging signal by calculating third security information and by comparing the calculated third security information with fourth security information included in the received security data, the third security information being calculated by using first security information which is made public and second security information which is managed by the mobile station and an output unit configured to output the paging signal when the verification of the paging signal succeeds.

In the second aspect, wherein when the second security information is not managed, the verifier unit verify the paging signal by calculating sixth security information and by comparing the calculated sixth security information with the fourth security information, the sixth security information being calculated by using the first security information and fifth security information which is included in the received paging signal.

In the second aspect, wherein the second security information is updated at predetermined timing or in response to a notification from the network node.

BEST MODE FOR CARRYING OUT THE INVENTION

Figure 1:
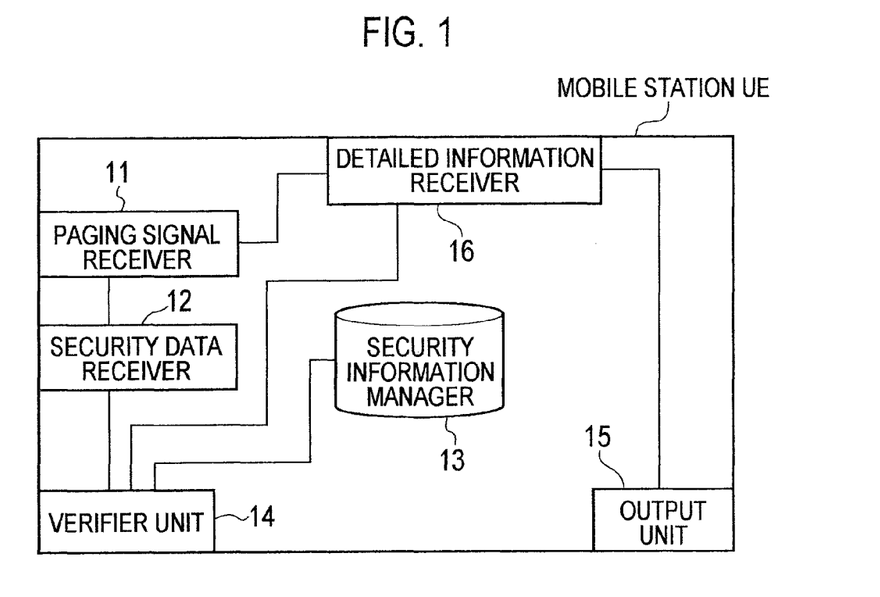
FIG. 1 is a functional block diagram of a mobile station according to a first embodiment of the present invention.
Figure 2:
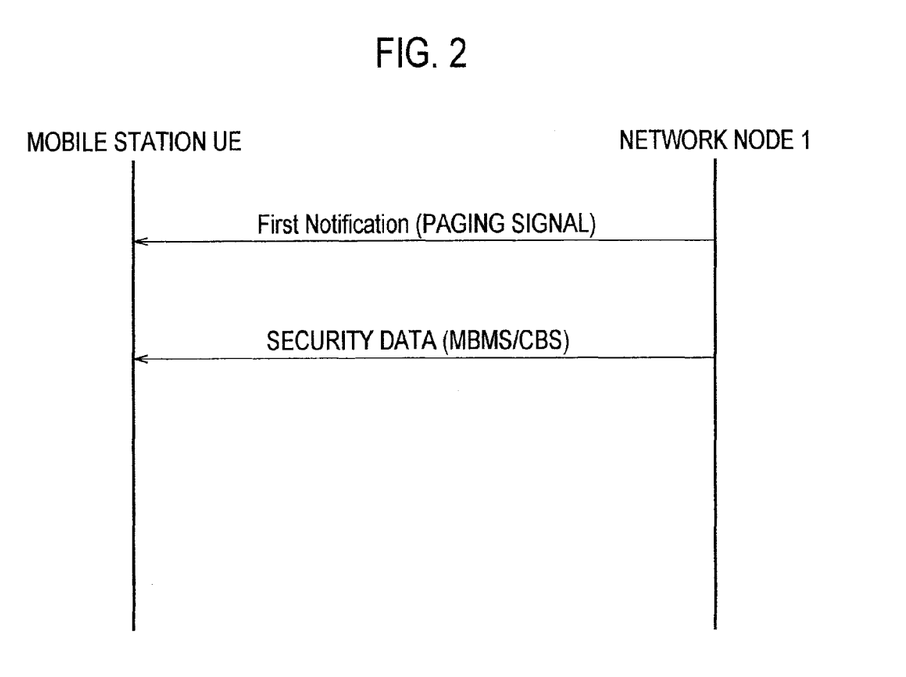
FIG. 2 is a diagram for explaining a "First Notification (paging signal)" and "security data" which are transmitted by a network node according to the first embodiment of the present invention.
Figure 3:
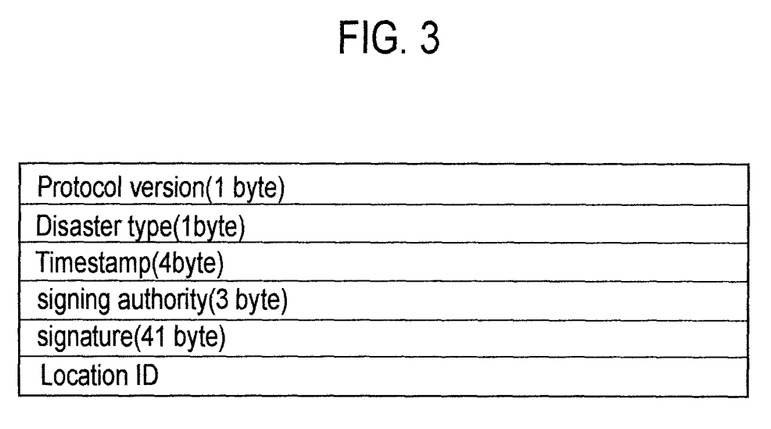
FIG. 3 is a diagram for explaining the "security data" transmitted by the network node according to the first embodiment of the present invention.

Configuration of Mobile Communication System According to First Embodiment of the Present Invention A description is given of a configuration of a mobile communication system according to a first embodiment of the present invention with reference to FIG. 1 to FIG. 3.

The mobile communication system according to the first embodiment of the present invention has the same configuration as that of the ETWS shown in FIG. 7, and the network node 1 is configured to transmit a paging signal to the multiple mobile stations UE.

Note that the present invention is applicable to a mobile communication system employing any scheme, such as an LTE (Long Term Evolution) mobile communication system, a W-CDMA (Wideband-Code Division Multiple Access) mobile communication system, a 3GPP2 mobile communication system, a UMTS (Universal Mobile Telecommunications System) mobile communication system or a GSM (Global System for Mobile Communications) mobile communication system.

For example, when the present invention is used for the LTE mobile communication system, the network node 1 is a radio base station eNB. When the present invention is used for the W-CDMA mobile communication system, the network node 1 is a radio control station RNC.

As shown in FIG. 1, the mobile station UE according to this embodiment includes a paging signal receiver 11, a security data receiver 12, a security information manager 13, a verifier 14, an output unit 15 and a detailed information receiver 16.

As shown in FIG. 2, the paging signal receiver 11 is configured to receive a "First Notification (paging signal)" transmitted by the network node 1, through a paging channel (PCH).

The "First Notification (paging signal)" includes an "IMSI (International Mobile Subscriber Identity)" constituted of an "MCC (Mobile Country Code)," an "MNC (Mobile Network Code)" and an "MSIN (Mobile Subscriber Identification Number)."

Basically, the "IMSI" is an identifier for globally identifying a mobile station UE. However, the "IMSI" also plays a role as a communication identifier indicating the presence of specific communication (for example, emergency information such as earthquake information or tsunami information) to be transmitted to each of the multiple mobile stations UE.

For example, in the "IMSI" which is set in the "First Notification (paging signal)" for indicating an emergency communication and which plays a role of the communication identifier indicating the presence of emergency information, "901" is set in the "MCC" and "08" is set in the "MNC."

As shown in FIG. 2, the security data receiver 12 is configured to receive security data from the network node 1 through a channel (for example, a channel for MBMS (Multimedia Broadcast Multicast Service) or a channel for CBS (Cell Broadcast Service)) designated by the "First Notification (paging signal)."

As shown in FIG. 3, the security data includes, for example, a "Protocol version (one byte)," a "Disaster type (one byte)," a "Timestamp (four bytes)," a "signing authority (three bytes)," a "signature (41 bytes)," a "Location ID" and the like.

The "Protocol version" indicates the version information of a protocol used in the application layer.

The "Disaster type" indicates the type of a disaster, such as an earthquake, a tsunami or terrorism.

The "Timestamp" indicates the time when the "First Notification (paging signal)" or the security data is transmitted, or the time when the "signature (41 bytes)" included in the security data was issued.

The "signing authority" indicates a provider or an operator who issued the "First Notification (paging signal)" or the security data.

The "signature" is a digital sign (fourth security information) of the provider or the operator who issued the "First Notification (paging signal)" or the security data.

The "Location ID" identifies an area where the disaster occurred.

Note that the security data is configured to be updated by the network node 1 at predetermined timing.

The security information manager 13 is configured to manage first security information and second security information.

Note that the first security information is a public key of the provider or the operator who issues the "First Notification (paging signal)" or the security data.

Note that the security information manager 13 is configured to determine which first security information (public key) should be used, on the basis of the aforementioned "signing authority."

Meanwhile, the second security information is distributed by the network node 1 at predetermined timing.

Specifically, the security information manager 13 is configured to acquire the second security information from the network node 1 at the time of location registration processing (Attach procedure), at the time of location registration update processing (TAU: Tracking Area Update procedure) by the mobile station UE, or the like.

Note that the security information manager 13 is configured to update the second security information at predetermined timing (for example, periodically) or in response to a notification from the network node 1.

The verifier 14 is configured to perform verification of the correctness of the "First Notification (paging signal)" in the following manner. Third security information is calculated by using the first security information and the second security information each of which is managed by the security information manager 13, and then the thus calculated third security information is compared with the "signature (fourth security information)" included in the security data received by the security data receiver 12.

Figure 4:
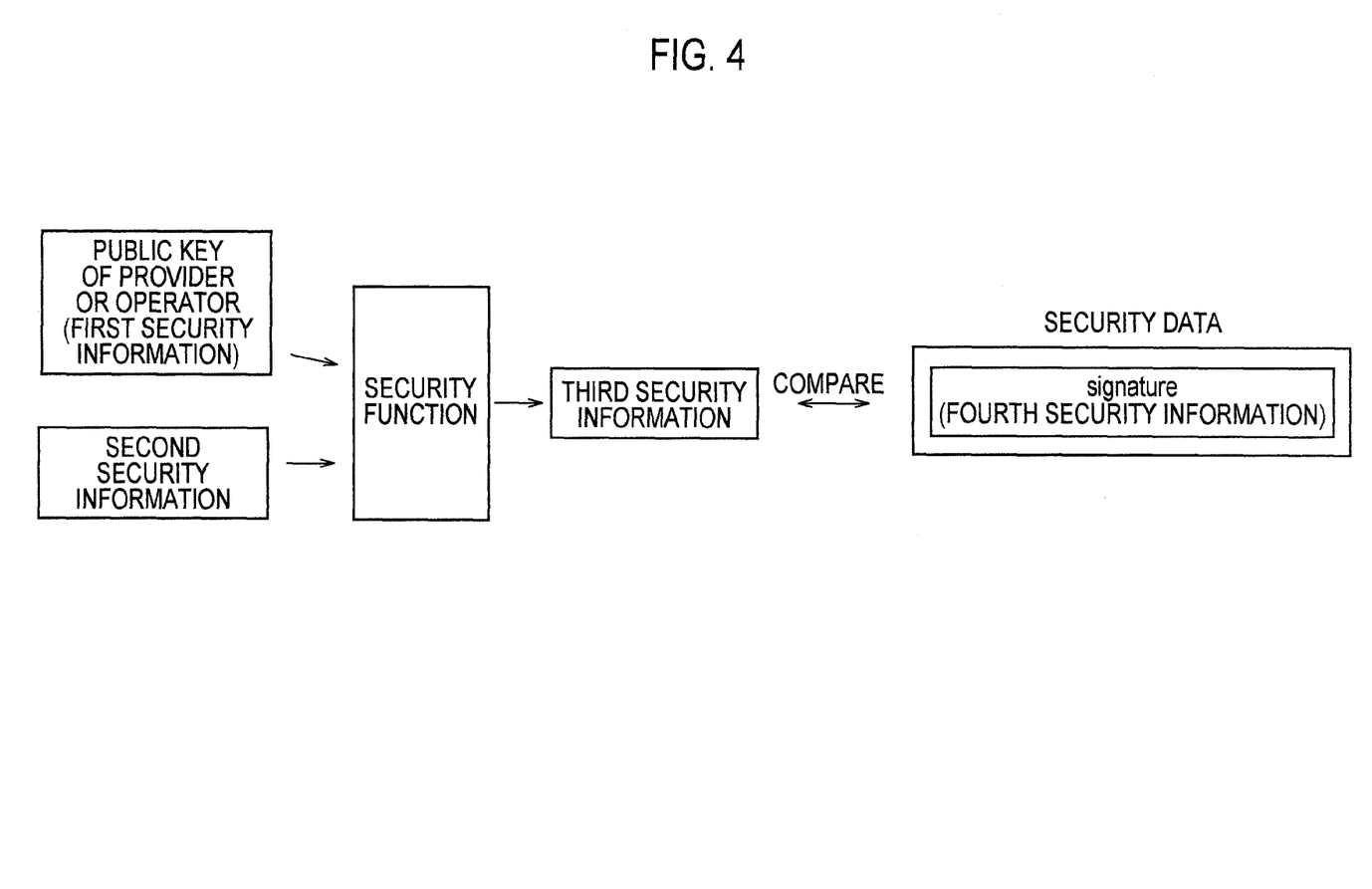
FIG. 4 is a diagram for explaining a verification performed by the mobile station according to the first embodiment of the present invention.

Specifically, as shown in FIG. 4, the verifier 14 may be configured to determine that the verification succeeds in a case where the third security information matches the "signature (fourth security information)" included in the security data. The third security information is obtained in such a manner that the first security information and the second security information each of which is managed by the security information manager 13 is inputted in a security function (for example, a hash function).

In addition, the verifier 14 may be configured to perform the verification of the correctness of the "First Notification (paging signal)" in the following manner when the second security information is not managed by the security information manager 13. Specifically, the verifier 14 calculates sixth security information by using the aforementioned first security information and a "security bit (fifth security information)" which is included in the received "First Notification (paging signal)," and then compares the thus calculated sixth security information with the aforementioned fourth security information.

Figure 5:
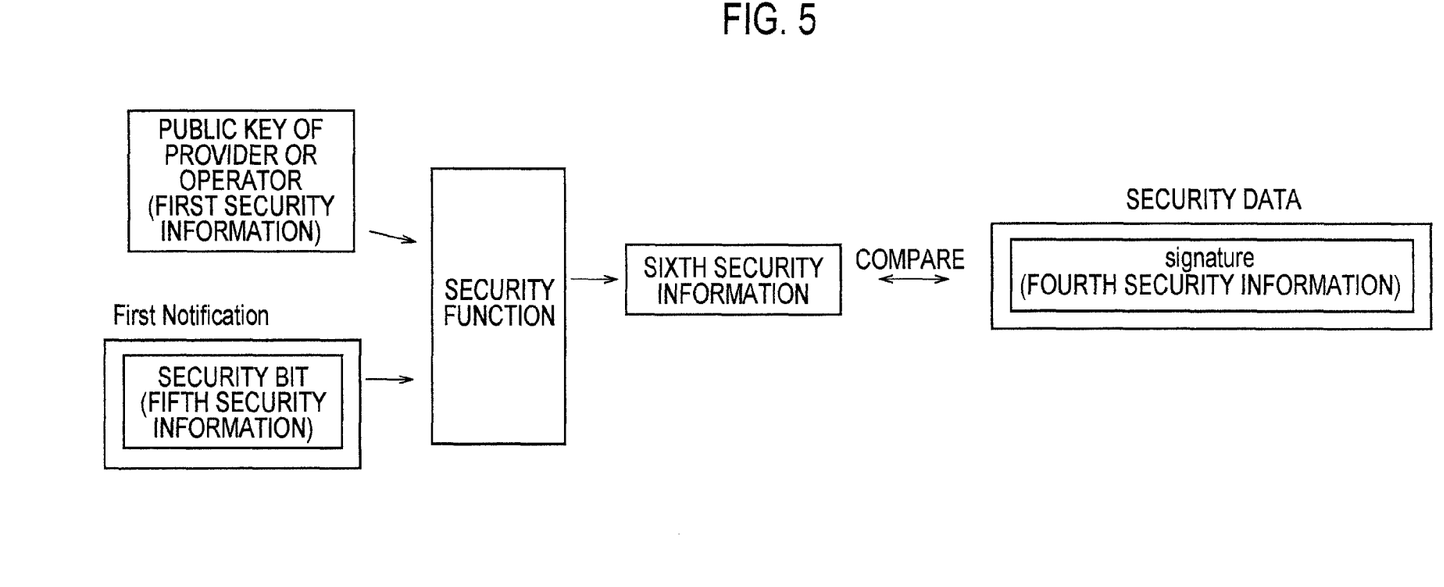
FIG. 5 is a diagram for explaining a verification performed by the mobile station according to the first embodiment of the present invention.

Specifically, as shown in FIG. 5, the verifier 14 may be configured to determine that the verification succeeds succeeded in a case where the sixth security information matches the "signature (fourth security information)" included in the security data. The sixth security information is obtained in such a manner that the first security information managed by the security information manager 13 and the "security bit (fifth security information)" included in the received "First Notification (paging signal)" is inputted in a security function (for example, a hash function).

The verifier 14 may be configured to determine that the verification succeeds only in a case where: the aforementioned comparison results match; and the time set in the aforementioned "Timestamp" and the time defined by a clock of the mobile station UE match within a predetermined time range.

Alternatively, the mobile station UE may be configured to determine that the verification succeeds only in a case where: the aforementioned comparison results match; and by using a location measurement method such as a GPS, the mobile station UE determines that the mobile station UE is located in the same area as an area (an area where the disaster has occurred) set in the "Location ID."

The output unit 15 is configured to perform output (such as buzzer output, alarm output or displaying on a display) for the "First Notification (paging signal)" in a case where the verification of the correctness of the "First Notification (paging signal)" by the verifier 14 succeeds.

The output unit 15 may be configured to perform output in the following manner when a network node transmits multiple "First Notifications (paging signals)" through a single paging channel. Specifically, among the multiple "First Notifications (paging signals)," the output unit 15 performs output for a "First Notification (paging signal)" for which the aforementioned verification succeeds.

In addition, the output unit 15 is configured to display the detailed information (corresponding to the "First Notification (paging signal)") of the emergency information received by the detailed information receiver 16, on the display.

For example, information indicating the seismic intensity of an earthquake, a place of refuge, the time and place of food distribution, or the like is assumed as the detailed information. The detailed information may be small-volume text data or large-volume data.

The detailed information receiver 16 is configured to receive the aforementioned detailed information when the aforementioned verification succeeds, the detailed information being received based on information designated by the aforementioned "First Notification (paging signal)."

For example, the detailed information receiver 16 may be configured to receive, when the aforementioned verification succeeds, the aforementioned detailed information through a channel identified by a "Channel Type," a "Frequency" or the like included in the aforementioned "First Notification (paging signal)."

Figure 6:
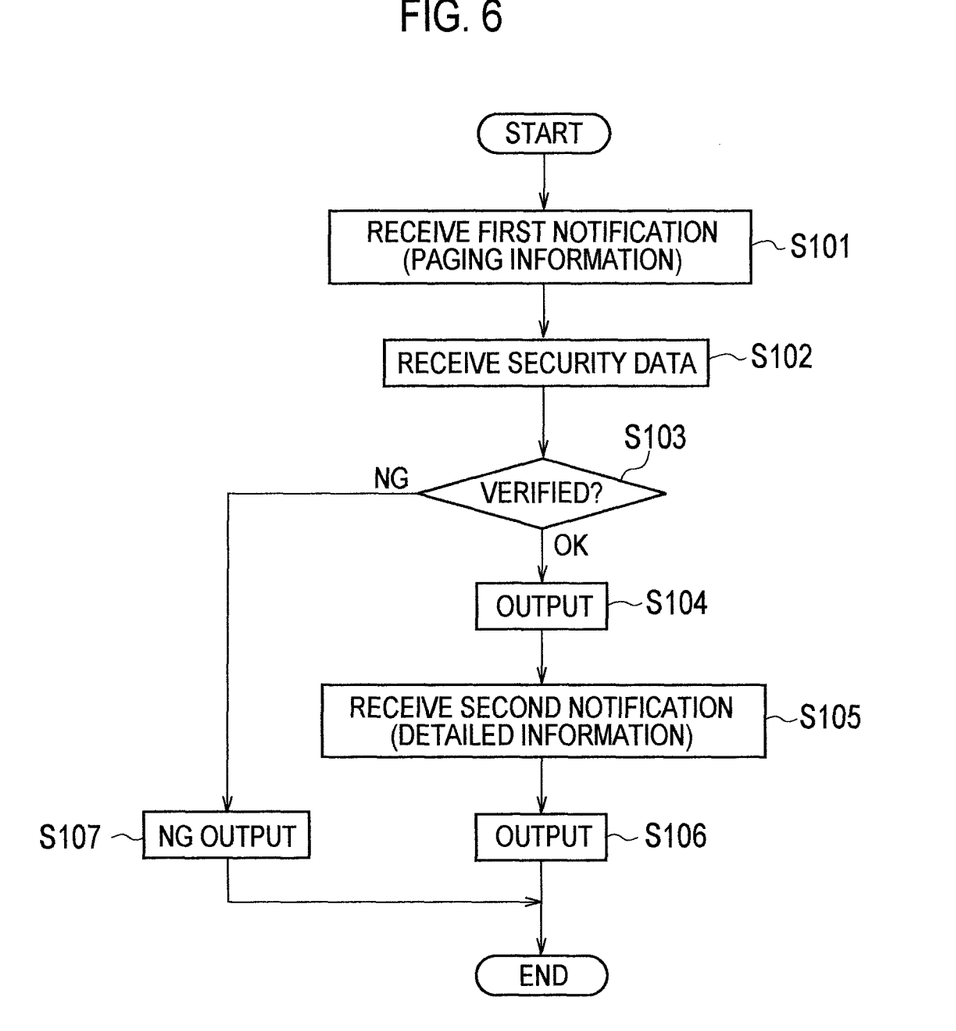
FIG. 6 is a flowchart for explaining an operation of the mobile station according to the first embodiment of the present invention.

Operation of Mobile Communication System According to First Embodiment of the Present Invention A description is given of an operation of the mobile station UE in the mobile communication system according to the first embodiment of the present invention with reference to FIG. 6.

As shown in FIG. 6, the mobile station UE receives a "First Notification (paging signal)" from the network node 1 in Step S101.

In Step S102, the mobile station UE receives security data through a channel designated by the received "First Notification (paging signal)."

In Step S103, the mobile station UE performs verification of the correctness of the "First Notification (paging signal)" by itself by using: the aforementioned fourth security information included in the received security data; and the aforementioned first security information and the second security information each of which is managed by the mobile station UE.

Note that, when the aforementioned second security information is not managed, the mobile station UE performs the verification of the correctness of the "First Notification (paging signal)" by itself by using: the aforementioned fourth security information included in the received security data; and the aforementioned first security information and the aforementioned fifth security information each of which is managed by the mobile station UE.

When the verification succeeds, the operation proceeds to Step S104. When the verification fails, the operation proceeds to step S107.

In Step S104, the mobile station UE performs output (for example, displaying an emergency information news flash or the like on the display) for the "First Notification (paging signal)."

The mobile station UE receives a "Second Notification" corresponding to the "First Notification (paging signal)" in step S105, and displays detailed information notified by the "Second Notification" on the display in step S106.

In step S107, the mobile station UE performs output indicating that the verification in step S103 have failed.

Operations and Effects of Mobile Communication System According to First Embodiment of the Present Invention In the mobile communication system according to the first embodiment of the present invention, the mobile station UE is configured to perform verification of the correctness of a "First Notification (paging signal)" on the basis of: the fourth security information included in the received security data; and the first security information and the second security information each of which is managed by the mobile station UE. Accordingly, transmission of a paging signal by secure communication can be achieved.

Furthermore, in the mobile communication system according to the first embodiment of the present invention, the security data is transmitted not by being included in the "First Notification (paging signal)" but through a channel designated by the "First Notification (paging signal)." Accordingly, even when transmittable data volume is limited in the "First Notification (paging signal)," transmission of the paging signal by secure communication can be achieved.

Note that operation of the above described mobile station UE and of the network node 1 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

All content of the Japanese patent application 2008-042098 (Filing date is 22 Feb. 2008) are described into this application by the reference.

INDUSTRIAL APPLICABILITY

As described above, according to the present invention, it is possible to provide a paging signal transmission method capable of transmitting a paging signal to multiple mobile stations by secure communication and to provide a mobile station for the same.

The invention claimed is:

1. A paging signal transmission method by which a network node transmits a paging signal to a plurality of mobile stations, the method comprising the steps of:
receiving security data at each of the plurality of mobile stations from the network node through a channel designated by the paging signal;
calculating third security information at each of the plurality of mobile stations by using first security information which is made public and second security information which is managed by the each mobile station;
verifying correctness of the paging signal at each of the plurality of mobile stations by comparing the calculated third security information with fourth security information included in the received security data; and
performing outputting for the paging signal from each of the plurality of mobile stations when the verification of the correctness of the paging signal succeeds at the each mobile station, wherein
when the second security information is not managed, the each of the plurality of mobile stations calculates sixth security information by using the first security information and fifth security information which is included in the received paging signal, and
the each of the plurality of mobile stations performs the verification of the correctness of the paging signal by comparing the calculated sixth security information with the fourth security information.

2. The paging signal transmission method according to claim 1, wherein the security data is updated by the network node at predetermined timing.

3. The paging signal transmission method according to claim 1, wherein the second security information is updated at predetermined timing or in response to a notification from the network node.

4. A mobile station used in a mobile communication system in which a network node is configured to transmit a paging signal to a plurality of mobile stations, the mobile station comprising:
a security data receiver configured to receive security data from the network node through a channel designated by the paging signal;
a verifier configured to perform verification of correctness of the paging signal by calculating third security information and by comparing the calculated third security information with fourth security information included in the received security data, the third security information being calculated by using first security information which is made public and second security information which is managed by the mobile station; and
an output unit configured to perform output for the paging signal when the verification of the correctness of the paging signal succeeds,
wherein when the second security information is not managed, the verifier performs the verification of the correctness of the paging signal by calculating sixth security information and by comparing the calculated sixth security information with the fourth security information, the sixth security information being calculated by using the first security information and fifth security information which is included in the received paging signal.

5. The mobile station according to claim 4, wherein the second security information is updated at predetermined timing or in response to a notification from the network node.

* * * * *